United States Patent
Knab

(10) Patent No.: US 12,006,038 B2
(45) Date of Patent: Jun. 11, 2024

(54) DEVICE AND METHOD FOR BLASTING AVALANCHES

(71) Applicant: Höhenarbeit GmbH, St. Veit im Pongau (AT)

(72) Inventor: Philipp Knab, St. Veit im Pongau (AT)

(73) Assignee: Höhenarbeit GmbH, St Veit im Pongau (AT)

( * ) Notice: Subject to any disclaimer, the term of this patent is extended or adjusted under 35 U.S.C. 154(b) by 101 days.

(21) Appl. No.: 17/612,982

(22) PCT Filed: May 20, 2020

(86) PCT No.: PCT/EP2020/064155
§ 371 (c)(1),
(2) Date: Nov. 19, 2021

(87) PCT Pub. No.: WO2020/234400
PCT Pub. Date: Nov. 26, 2020

(65) Prior Publication Data
US 2022/0212791 A1 Jul. 7, 2022

(30) Foreign Application Priority Data

May 21, 2019 (AT) .............................. A 60128/2019
Jan. 30, 2020 (AT) .............................. A 50076/2020

(51) Int. Cl.
*B64C 39/02* (2023.01)
*B64U 101/15* (2023.01)
(Continued)

(52) U.S. Cl.
CPC ............ *B64C 39/024* (2013.01); *F42D 1/045* (2013.01); *F42D 3/00* (2013.01); *B64U 2101/15* (2023.01); *B64U 2201/202* (2023.01)

(58) Field of Classification Search
CPC .................................................... B64C 39/024
See application file for complete search history.

(56) References Cited

U.S. PATENT DOCUMENTS 10,491,021 B1 * 11/2019 Syracuse ................. B64C 39/04
2011/0139029 A1 6/2011 Farizy et al.
(Continued)

FOREIGN PATENT DOCUMENTS

CH 696282 A5 3/2007
DE 4302252 C1 9/1993
(Continued)

OTHER PUBLICATIONS

Google Machine Translation of International Patent Pub. No. WO1980001511A1 to Schroecksnadel et al. that was filed in 1980 that is prior to the effective filing date of May 21, 2019.*
(Continued)

*Primary Examiner* — Jean Paul Cass

(57) ABSTRACT

A device and a method for blasting avalanches. The device comprises a drone, and an explosive charge attached to the drone in a freely suspended manner by means of a cord. An ignition mechanism is provided for igniting the explosive charge. The ignition mechanism can be triggered by remote control or automatically. Any desired destinations can be approached using this device in order to trigger avalanches. In this manner, the explosive charge can be positioned above the snow cover to be blasted.

10 Claims, 5 Drawing Sheets

(51) Int. Cl.
*F42D 1/045* (2006.01)
*F42D 3/00* (2006.01)

(56) References Cited

U.S. PATENT DOCUMENTS

| | | | |
|---|---|---|---|
| 2014/0353422 A1 | 12/2014 | Westbrook, Sr. | |
| 2019/0023392 A1* | 1/2019 | Micros | B64C 33/02 |
| 2019/0379226 A1* | 12/2019 | Syracuse | H02J 50/001 |
| 2020/0324902 A1* | 10/2020 | Burgess | B64C 39/024 |

FOREIGN PATENT DOCUMENTS

| | | | | |
|---|---|---|---|---|
| EP | 0324723 A2 | | 7/1989 | |
| EP | 2977318 B1 | | 5/2018 | |
| EP | 3931926 B1 | * | 3/2023 | G01R 31/52 |
| FR | 2964732 A1 | | 3/2012 | |
| WO | 8001511 A1 | | 7/1980 | |
| WO | WO-8001511 A | * | 7/1980 | F42D 3/00 |
| WO | 2012035215 A1 | | 3/2012 | |
| WO | WO-2021174291 A1 | * | 9/2021 | B64C 39/024 |

OTHER PUBLICATIONS

Google Machine Translation of European Patent Pub. No. EP2860838B1 to Wei that was filed in 2014.*
NPL, P. Bartel, Modeling mass-dependent flow regime transitions to predict the stopping and depositional behavior of snow avalanches, Journal of Geophysical Research, vol. 117, F01015 (Feb. 7, 2012).*
Kraft, Caleb, Irobot gets awesome exploding rope technology, Hackaday video and citing Youtube, (https://hackaday.com/2010/06/01/irobot-gets-awesome-exploding-rope-thingy/) (Jun. 1, 2010). (Year: 2010).*

* cited by examiner

DEVICE AND METHOD FOR BLASTING AVALANCHES

FIELD OF THE INVENTION

The invention relates to a device and a method for blasting avalanches.

BACKGROUND OF THE INVENTION

Snow avalanches are dangerous for persons located in the area of a potential avalanche cone. In addition, avalanches destroy infrastructure facilities such as electricity pylons or roads or block the latter for extended periods of time.

In order to limit the dangers of such snow avalanches, which are referred to just as avalanches hereinafter, the controlled triggering of avalanches by means of a detonation is known. Hereby it can on the one hand be ensured that nobody is in the range of the avalanche and insured when the avalanche descends. Furthermore, if the descent of the avalanche is triggered prematurely, it can be ensured that the destructive potential of the avalanche is low enough for infrastructure facilities not to be damaged. If we were to wait too long at a persistent snowfall, for example, the potential amount of snow that can be carried along by the avalanche would increase, resulting in unwanted destruction.

Various devices and methods are available for blasting avalanches.

In places where avalanches have to be blasted frequently, there are permanently installed devices such as blasting cable cars, blasting masts or blasting pipes.

A blasting cable car comprises a cable that is permanently installed in the area above a blasting point. A slide is movably mounted on the cable. An explosive charge is suspended from the slide by means of a cord. The explosive charge is provided with a detonator detonating automatically after a predetermined time following activation.

The slide with the charge is moved into the area above the blasting site, where the explosive charge is ignited and triggers the avalanche.

The blasting pipes are designed such that they terminate with an opening above the snow cover, the opening of the pipe being inclined slightly downwards. The gaseous explosive charge is ignited in the pipe under remote control, so that a hot gas stream hits the snow cover in a targeted manner and triggers an avalanche.

The use of blasting pipes involves the disadvantage that the hot gas stream makes the snow melt in the local environment. The melted snow cover then freezes and hardens again. This is in particular the case if the blast does not trigger an avalanche. The repeated blasting can generate an ice plate that is very stable. This makes the further blasting of avalanches ineffective, since the gas stream cannot trigger any further avalanche although unstable snow areas may well be present in the immediate vicinity.

In a blasting mast a detonation can be triggered via radio.

Also known is the dropping of explosive charges exploding while lying in the snow cover and thus triggering an avalanche by means of a helicopter.

These different methods have various advantages and disadvantages.

Blasting cable cars, blasting masts and blasting pipes only make sense if avalanches have to be blasted regularly at specific locations. This is for example the case in skiing areas to ensure that no ski slopes are buried. Depending on weather conditions and in particular on the wind direction during the snowfall, there can be an avalanche risk on various slopes. In practice it is not possible to provide all slopes with a blasting device.

If the explosive charge is dropped from a helicopter, such an avalanche blasting can be adapted to the current avalanche situation in a much more individual way. If there is an avalanche risk, for example only on south-facing slopes, avalanches are then triggered only on south-facing slopes.

The dropping of explosive charges from a helicopter involves disadvantages as well, however. The explosive charge can slip off a hard snow cover and detonate at a completely different point. In this it has to be taken into account that, according to legal regulations, the explosive charge is only allowed to ignite two minutes after being dropped from the helicopter. The helicopter has to have enough opportunity to move away from the blasting site. If the snow cover is hard, it may happen that the explosive charge has already slipped towards the valley to a major extent before it ignites.

Furthermore, once an explosive charge has been dropped from the helicopter and activated, it can no longer be defused.

A further major problem when blasting avalanches by means of a helicopter is posed by misfiring. The detonation has to be carried out by a blaster. The blaster is responsible for the removal of non-ignited explosive charges. If a non-ignited explosive charge lies on a potential avalanche slope, the retrieval involves the risk of the blaster himself being caught by an avalanche.

The biggest problem, however, is that a blasting site cannot be approached in bad weather. This is particularly critical in a protracted period of bad weather, e.g. of two to three weeks, with a lot of precipitation. In this case it can even happen that blasting devices are completely snowed under, so that they can no longer be used. Such weather conditions, however, are the ones that can cause avalanches with a high destructive potential even in places where there is often no avalanche risk. In such places there are usually no permanently installed avalanche blasting devices such as a blasting cable car or a blasting pipe, since the descent of an avalanche is not anticipated here. Such avalanches can nevertheless bury roads, overturn electricity pylons or even hit houses.

A further disadvantage lies in the fact that an explosive charge dropped from the helicopter explodes in the snow and the blast wave is significantly attenuated by the snow cover in this process. It is much more efficient if the explosive charge is ignited slightly above the snow cover, as in the case of a blasting cable car or a blasting mast. With a blasting cable car, however, it is impossible to approach any site flexibly. In addition, it is sometimes difficult to coordinate the movement of the slide of the blasting cable car and the ignition time of the explosive charge correctly. There is therefore a great need for the provision of a device and a method for blasting avalanches whereby avalanches can be triggered in different locations even in prolonged bad weather.

From European Patent 2 977 318 B1, there emerges the use of a drone for transporting an explosive charge for triggering an artificial avalanche release, wherein the explosive charge is located outside the flying device by means of a cable. The flying device comprises a triggering device generating an electric current that flows along the cable to ignite the explosive charge. The triggering device can be located directly at the drone or else directly at the explosive charge. A pyrotechnical material can be used as blasting material.

From US 2014/0353422 A1, there emerges the use of a drone for dropping explosive devices at predetermined points. This is used for freeing paths that are difficult to access or to blast away snow hills in the mountains.

Further blasting equipment for blasting avalanches emerges from FR 2 964 732 A1 and US 2011/0139029 A1, for example.

The invention is based on the problem of further developing a device with a drone and a method for blasting avalanches in such a way that unstable snow masses can be triggered reliably irrespective of the weather at diverse locations while ensuring maximum safety for the user.

SUMMARY OF THE INVENTION

According to one aspect of the invention, the device for blasting avalanches comprises a drone, an explosive charge attached to the drone in a freely suspended manner by means of a cord and an ignition mechanism for igniting the explosive charge, the ignition mechanism being designed for remote-controlled or automatic triggering.

This device is characterised by the fact that the ignition mechanism is arranged at the cord at a distance from the drone and at a distance from the explosive charge in such a way that the ignition mechanism cannot be misfired by electric elements of the drone on the one hand and is not damaged during the blasting of the explosive charge on the other hand. This eliminates a significant safety hazard of unintentional triggering. This is particularly advantageous, because an explosive charge is used instead of a pyrotechnical blasting means having a considerably lower explosive effect. Blasting materials used for the purpose of the present invention are explosive materials of the 1.1 D hazard class, i.e. detonating explosive materials or gunpowder capable of mass explosion (a mass explosion is an explosion involving almost the entire charge virtually simultaneously).

The ignition mechanism is fastened to the cord. The ignition mechanism can be connected to the explosive charge by a thin ignition lead.

With the drone the explosive charge can be flown to any point in the mountains, so that the location of the triggering of an avalanche can be chosen freely. Since the explosive charge is attached at a safe distance from the drone with a cord, the explosive charge can be ignited while still being freely suspended from the drone. There is no need for dropping the explosive charge. This makes it possible to ignite the explosive charge a little above the snow cover, which is considerably more efficient than dropping the explosive charge. Thanks to the remote-controlled or automatic triggering of the ignition mechanism, the operator of the device, who is usually a blaster, can remain outside any hazard areas.

The drone can be flown even in bad weather. On the one hand, the drone can simply be transported to the vicinity of the deployment area by a motor vehicle, so that there is basically no need for long flights, but the deployment site or destination can be reached with a relatively short flight. This can be achieved considerably more easily in bad weather than with a helicopter. On the other hand, a crash of the drone does not involve any risk of damage to humans. This being so, a much higher flight risk can be accepted with a drone flight than with a helicopter flight. If there is any danger of infrastructure damage, the costs of a drone, which are a few ten thousand Euros as a rule, are low compared to the costs which can be caused by avalanche damage.

The distance between the drone and the ignition mechanism is at least 5 m and preferably at least 10 m.

The distance between the ignition mechanism and the explosive charge is at least 5 m, in particular at least 10 m and preferably at least 15 m.

The cord is at least 10 m or at least 20 m, preferably at least 30 m and in particular at least 35 m or at least 40 m long, one end of the cord being connected to the drone and the other end of the cord being connected to the explosive charge. The length of the cord between the drone and the explosive charge has to be dimensioned in accordance with the explosive effect of the explosive charge. The greater the explosive effect of the explosive charge, the longer the cord has to be, so that the drone is not damaged during the detonation of the explosive charge. For this reason it can indeed be expedient to give the cord a length of at least 30 m and in particular of at least 50 m.

According to a second aspect of the invention, the device for blasting avalanches is characterised by the fact that the cord has a blasting section directly connected to the explosive charge and to the rest of the cord by means of a releasable clamp.

As a result the drone does not have to land after the detonation of an explosive charge in order to attach a further explosive charge, but only has to be lowered far enough for the clamp to be operated by a user in order to release the part of the blasting section left after the last blasting operation and to attach a new blasting section with a new explosive charge. In this way the drone can be fitted with a further explosive charge very quickly. Several blasting operations can thus be carried out in a short time.

The blasting section has a length sufficient for the releasable clamp to be far away enough from the explosive charge, so that it is not destroyed in the blasting operation. Trials with common explosive charges have shown that the blasting section is usually destroyed along a length of 1.5 to 2 m. It is therefore expedient that the blasting section is at least 2 m or at least 3 m, in particular at least 3.5 m long. If an electric ignition mechanism is used, the blasting section incorporates a suitable electric line, and the clamp is designed to form an electric connection between the blasting sections and the other area of the cord leading to the ignition mechanism. The clamp can preferably be released and re-fixed by means of a click mechanism, facilitating a fast replacement of the blasting section.

According to a third aspect of the invention, the device for blasting avalanches is characterised by the fact that the device comprises a facility for detecting whether the explosive charge is grounded and an altimeter device for measuring the elevation of the drone.

In this way it can be established when the explosive charge is grounded, and at this moment or in this condition the elevation of the drone can be measured, so that it can be raised by a preset amount and the explosive charge can be ignited at the preset level above ground.

Any altimeter device can be used for this purpose. Preferably, however, an altimeter device is used which determines the elevation or the location of the drone by means of radio signals in a three-dimensional coordinate system. Such an altimeter device can detect the elevation irrespective of the weather, which does not apply to altimeter devices detecting the elevation by means of a laser beam. Such altimeter devices do not operate reliably in precipitation and fog.

The grounding of the explosive charge can be established by monitoring a drive power fed to motors for driving rotors of the drone. If the drive power drops while the drone maintains its elevation, this means that the load held by the drone is reduced. This is the case when the explosive charge is grounded. It is also possible to provide scales which measure the load hanging on the cord of the drone. If the weight hanging on the drone decreases, this can be interpreted as the grounding of the explosive charge. The scales do not have to be calibrated to a preset weight scale. The scales are adequately represented by a simple force sensor with which the force applied to the cord is monitored and, first and foremost, changes of said force or of the weight hanging from the cord can be detected.

A momentary grounding of the explosive charge can also be used to prevent a swinging of the explosive charge at the drone.

The device preferably has a location sensor. The location sensor is a radio location sensor in particular. A radio location sensor is a location sensor determining its location by means of radio signals. In this context two classes of location sensor are distinguished in particular, these being satellite location sensors and location sensors using mobile telephone signals for location. A satellite location sensor receives radio signals from satellites containing location and time data. Using these data, the location sensor can calculate its location in a three-dimensional coordinate system. Such satellite location sensors are known as GPS sensors, for example. The location sensors operating with mobile telephone signals calculate their location by means of a triangulation of the mobile telephone signals. With one of these location sensors the drone can detect its location automatically.

Using such a radio location sensor the relative elevation of the drone can be determined very accurately even in bad weather. Following the grounding of the explosive charge as explained above, the elevation of the explosive charge above ground achieved by raising can be determined very precisely with the radio location sensor.

The device can comprise a control device with which the device can automatically approach a specific destination in accordance with coordinates determined by means of the location sensor. This being so, the location to be approached by the drone can be stored in advance in the flight control device, so that the drone approaches this location independently without the flight of the drone having to be controlled by a person. On reaching the destination, only the ignition mechanism has to be triggered to ignite the explosive charge.

The ignition mechanism can also be triggered automatically, however, for example if it has been established automatically that the drone and thus the entire device are at the desired destination.

The device can be provided with a camera for visible light and/or a camera for infrared radiation. The viewing direction of these cameras is downward or obliquely downward, so that the ground can be scanned optically during the flight of the drone. The camera for detecting infrared radiation, which is also described as thermal imager, is used to establish whether there are any living creatures in the area where the explosive charge is to be ignited and/or the avalanche is to descend.

A radio device is preferably provided for transmitting sensor signals and/or camera signals. With this radio device the location coordinates detected by means of the location sensor and/or the image signals detected by means of the camera and/or elevation values detected by the altimeter can be transmitted, for example.

During the transmission of location coordinates a user can control the flight of the drone using the location coordinates received. This is particularly expedient if no target coordinates are known and the destination is to be approached under remote control. These data can be received by a remote control and/or a server.

Using the image signals, the potential avalanche cone can be scanned before a blasting operation with the drone in order to establish whether there are any humans, animals or objects present which might be caught by the blasted avalanche. This is in particular possible by means of image signals of a thermal imager (camera for infrared radiation), with which living creatures are made visible with a high contrast against the cold background of a snow cover. The cord can be secured to the drone by means of a dropping device designed for triggering under remote control. If the cord is caught on a tree, for example, it can be released from the drone, so that the latter is not lost. When dropping the cord and thus the explosive charge, the location of the device is preferably detected, so that the search for the explosive charge is considerably simpler later on.

By transmitting the elevation values and the location coordinates to a server, the latter can determine the thickness of the snow cover by comparing the elevation values above the snow cover to stored elevation values from a measurement at the same point taken at the time when there was no snow. From this a profile of the snow cover can be calculated automatically by collecting several elevation values and the corresponding location coordinates. Such snow cover profiles can also be collected regularly over predetermined time intervals of some days or weeks, thus establishing a development of the snow cover profile. From these data the avalanche risk can be assessed. This applies in particular if these data are linked to corresponding weather data, in particular the temperature and the wind, at the respective snowfall. This being so, the avalanche risk can be assessed very precisely at the server, because the actual snow levels are incorporated into the assessment.

The system can be designed such that an optimum blasting location can be calculated by means of the assessment of the avalanche risk. This optimum blasting location can be transmitted to the drone, which then automatically performs the blasting operation there. This system represents an independent inventive idea which can also be used in other types of avalanche blasting with drones, such as avalanche blasting in which an explosive charge is dropped from the drone. The assessment of the avalanche risk rests on a large data base that preferably comprises a model of the slope in which the contour of the slope is modelled. Furthermore, the constitution of the slope surface (e.g. meadow, bushes, trees, rocks) can be included in the data base. The data base can contain comprehensive weather data describing not only the current weather, but also the weather of the last few days or weeks. This data base is compared to the current measurement of the snow height, wherein the measurement of the snow height preferably includes a profile of the snow cover across a specific area, i.e. several locally distributed measuring points of the snow height are available. This combination of a large data base and the current measurement of the snow height or the thickness of the snow cover allows a much more precise assessment of the avalanche risk than conventional systems for assessing the local avalanche risk, whereby a very precise determination of the blasting site and thus the steering of the drone to the blasting site is made possible.

In the determination of the blasting site a simulation of the avalanche descent to be expected can be taken into account as well. If the artificially generated avalanche is too large, for example, and there is a risk of damages, it can be expedient to blast the avalanche initially in a lower section of the slope, so that only a part of the snow load slips off, and then to blast the upper section of the slope in a second blasting operation.

Since the avalanche risk can be considerably different in individual locations because of the different contours of the slopes in the mountains, the different weather conditions and the different snow conditions, but similar conditions repeatedly prevail in the different locations, this system can preferably be designed with a self-learning computer system, e.g. a neuronal network, which learns the local conditions relating to the avalanche risk gradually in a learning mode. In such a learning mode the relevant data provided for determining the avalanche risk as explained above as well as further data documenting the success of the triggering of the avalanche are input. These data describing the success of the triggering of the avalanche can be acquired manually by the user and/or automatically by scanning the avalanche tear-off and/or the avalanche cone with a camera.

The transmission of sensor signals and/or camera signals is also used in the documentation of the blasting outcome or the preservation of evidence. After the blasting of the avalanche the drone can fly across the avalanche cone for gathering, transmitting and recording the corresponding image data. Even in bad weather conditions, in which it cannot be established from a distance if and how the avalanche has descended, meaningful information can be obtained thanks to the proximity to the avalanche cone which can be reached by the drone. The drone can be provided with an anti-collision device detecting the distance from an obstacle with an ultrasonic and/or radar sensor, which device allows the drone to fly close to potential obstacles (trees, rocks etc.) even in bad weather conditions. It can be expedient to limit the flight speed to allow the anti-collision device to function efficiently. During the use of the anti-collision device the maximum flight speed can for example be limited to 5 m/s or to 3 m/s. In this way data for the documentation of the avalanche descent, in particular image data showing the avalanche tear-off and/or the avalanche cone, can be gathered.

Furthermore a tracking transmitter, in particular a tracking transmitter as sold by the Recco company, can be fitted to the cord and/or to the explosive charge to facilitate a later search.

Instead of a dropping device that can be triggered by remote control, a fastening mechanism can be installed which automatically releases from a specific force momentum. This force momentum is higher than the weight suspended from the cord, so that the freely suspended cord with the explosive charge and the ignition mechanism, if applicable, can be held securely, and lower than the maximum force momentum that can be applied by the drone, allowing automatic release if the cord gets caught in a tree or at another object.

The device preferably has an altimeter device for measuring the elevation with respect to the ground. This altimeter device can be located at the drone and/or at the cord. The altimeter device can be a laser scanner, for example, with which the distance from the ground can be determined very precisely.

By means of the elevation value determined by the altimeter device, the destination of the drone can be corrected automatically and the distance from the snow surface can be adjusted automatically. Since the height of the snow cover changes at a snowfall, the blasting site can be adapted to the changed thickness of the snow cover by means of the altimeter device.

In a method for blasting an avalanche, a device as explained above, with a drone, with an explosive charge attached to the drone in a freely suspended manner by means of a cord and with an ignition mechanism for igniting the explosive charge, can be used. The drone is flown to a blasting site, which can also be described as a destination. In this the explosive charge is above a snow cover to be blasted and the ignition mechanism is triggered under remote control or automatically.

The destination is preferably determined in such a way that the explosive charge is at least 0.1 m, in particular at least 0.5 m, in particular at least 1 m or even at least 2 m, above the snow cover. This avoids the damping of the blast by the snow, which would be the case if the explosive charge were detonated within the snow cover.

The destination is preferably set up such that the explosive charge is no more than 10 m, in particular no more than 8 m and preferably no more than 5 m above the snow cover. The greater the distance of the explosive charge from the surface of the snow cover, the greater is its reach, but the less is its impulse on the snow cover. The actual distance of the explosive charge has therefore to be chosen by the blaster on site.

The elevation of the explosive charge above the ground can for example be determined by lowering the drone at the destination until the explosive charge is grounded and measuring the elevation of the drone with the altimeter device when the explosive charge is grounded. The drone is then raised by a predetermined amount, so that the explosive charge is above the ground by said predetermined amount. At the predetermined elevation above the ground, the explosive charge is ignited. In this way the elevation of the explosive charge above the ground can be adjusted exactly.

The grounding of the explosive charge can be detected by monitoring a drive power fed to motors for driving rotors of the drone. It is also possible to detect the grounding of the explosive charge by means of scales measuring the weight hanging from the cord.

The drone preferably approaches the blasting site automatically. In this case the destination is stored in the flight control device by means of location coordinates. In this way the destination can be reached reliably even in difficult flying conditions.

The flight of the drone can also be remote-controlled. This is particularly expedient when approaching destinations with unknown location coordinates.

According to a further aspect of the present invention, several devices for blasting avalanches can be used, each having a drone, an explosive charge attached to the drone in a freely suspended manner by means of a cord and an ignition mechanism for igniting the explosive charge, the ignition mechanism being designed for remote-controlled or automatic triggering. These devices are used simultaneously to approach with an explosive charge each an area where an avalanche is to be triggered artificially. The ignition mechanisms for igniting the explosive charge are synchronised with respect to one another. This synchronisation can mean that all ignition mechanisms trigger simultaneously, so that several explosive changes detonate simultaneously in a predetermined area and trigger one or more avalanches. It is, however, also possible that the individual explosive charges are synchronised in such a way that that they are triggered with a time offset. This time offset can for example correspond to the length of time required by the sound waves of a first blast to reach the area of the nearest second drone. Accordingly, the ignitions of the further drones farther away from the first drone can be delayed, so that a wave front spreads approximately continuously along the line at which the drones are arranged and is repeatedly boosted by further ignitions.

The synchronised ignition mechanisms can be triggered with a single radio signal. At simultaneous ignition all ignition mechanisms trigger immediately after receiving the radio signal. If the ignition mechanisms are to be synchronised in such a way that the individual ignitions are offset in time, additional information containing the time offset is preferably transmitted to each device or each ignition mechanisms with the ignition signal. The time offset can also be determined by calculating the spacing of the drones. For this purpose the location of the individual drones is detected and transmitted to the remote control 8. At the remote control 8 the spacing of the drones 2 and thus the time offsets are calculated.

The time offsets can be preset in the ignition mechanisms 5 as well, so that all ignition mechanisms 5 are triggered by a common radio signal and ignite with a time offset.

The aspects of the invention explained above can be used independently or else in any combination.

In principle it is expedient to provide two ignition mechanisms designed independently of each other. So-called HU igniters, which are highly sensitive and firedamp-proof, are preferably used as ignition mechanisms.

In place of an electric ignition mechanism, a mechanical ignition mechanism can be provided as well. This is a so-called break igniter. For this purpose the cord is designed in two sections, both sections being connected to the break igniter at one end each and fastened to the drone at the other end. One of the two sections is slightly shorter and forms a so-called losing section. This losing section preferably consists of a thin hemp rope, which is thrown off in the ignition process and can rot away.

The cord consisting of the two sections forms a loop, the break igniter being slightly above a lower end region of the loop.

If the losing section is released from the drone, the break igniter drops down slightly until the other section of the cord is stretched. This abruptly brakes the movement of the break igniter, so that the break igniter triggers an ignition.

With such a mechanical break igniter there is no need for an electric ignition of the explosive charge. Such a mechanical ignition mechanism is particularly reliable in weather conditions prevailing at the avalanche blasting process (cold, snowfall).

BRIEF DESCRIPTION OF THE DRAWINGS

The invention is explained in greater detail below by way of example with reference to the drawings. The drawings show diagrammatically in.

DETAILED DESCRIPTION OF THE PREFERRED EMBODIMENTS

Figure 1:
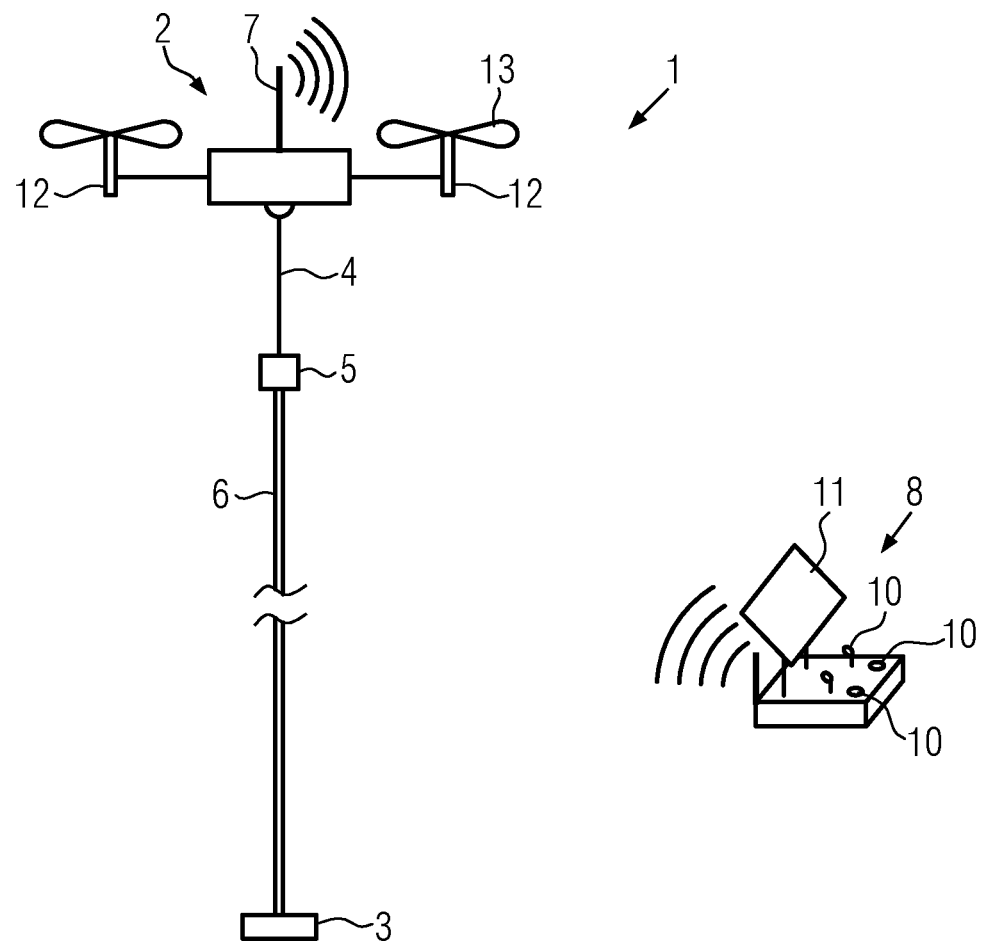
FIG. 1 a device for blasting an avalanche in a side view according to a first embodiment, FIG. 2 a drone forming a part of said avalanche blasting device in a block diagram, FIG. 3 a device for blasting an avalanche in a side view according to a second embodiment, FIG. 4 a device for blasting an avalanche in a side view according to a slightly modified second embodiment, and FIG. 5 a device for blasting an avalanche in a side view according to a third embodiment.

One embodiment of a device for blasting avalanches, which described as avalanche blasting device 1 in short below, comprises a drone 2, an explosive charge 3 attached to the drone 2 in a freely suspended manner by means of a cord 4. An ignition mechanism 5 for igniting the explosive charge 3 is attached to the cord 4. The ignition mechanism 5 is connected to the explosive charge 3 by an ignition lead 6.

The ignition mechanism 5 is designed for remote-controlled and/or automatic triggering. For remote-controlled triggering the ignition mechanism 5 has a radio receiver (not shown) for receiving a radio signal to ignite the primer.

The cord is for example an accessory cord with a diameter of 1 mm to 3 mm. It can have a load-bearing capacity of 100 kg to 300 kg.

The section of the cord between the drone 2 and the ignition mechanism 5 is preferably thicker than the section of the cord between the ignition mechanism 5 and the explosive charge 3. The thicker section of the cord has a thickness of at least 3 mm, for example, and preferably of at least 4 mm, and the thinner section is preferably thinner than 3 mm. This is particularly advantageous when starting and landing the drone 2, because the thicker section of the cord 4 is not so easily whirled up by the turbulence generated by the drone and entangled with a propeller of the drone.

The thicker section of the cord 4 is 5 m to 15 m long, for example, and the thinner section is 25 m to 40 m long, for example. The overall length of the cord 4 is 40 m to 65 m in the present embodiment.

The explosive charge 3 can comprise a blasting charge with a weight of some kilograms. The blasting charge can weigh up to 10 kg. A blasting charge with a weight of 2 kg to 5 kg is typically used.

The drone 2 preferably is a hexacopter or an octocopter, all flight-relevant components being provided redundantly, so that the drone 2 can continue to fly safely if an individual component fails.

The drone has an aerial 7 for transmitting and receiving a radio signal. The drone 2 can be controlled with a remote control 8, which can receive the radio signals from the drone 2 with its own aerial 9 and transmit corresponding radio signals for the control of the drone 2. The remote control 8 has inputting elements 10 for inputting control signals. In the present embodiment the inputting elements 10 are two operating levers and some keys. The remote control 8 is provided with a screen 11, on which signals received by the drone 2 can be depicted.

Figure 2:
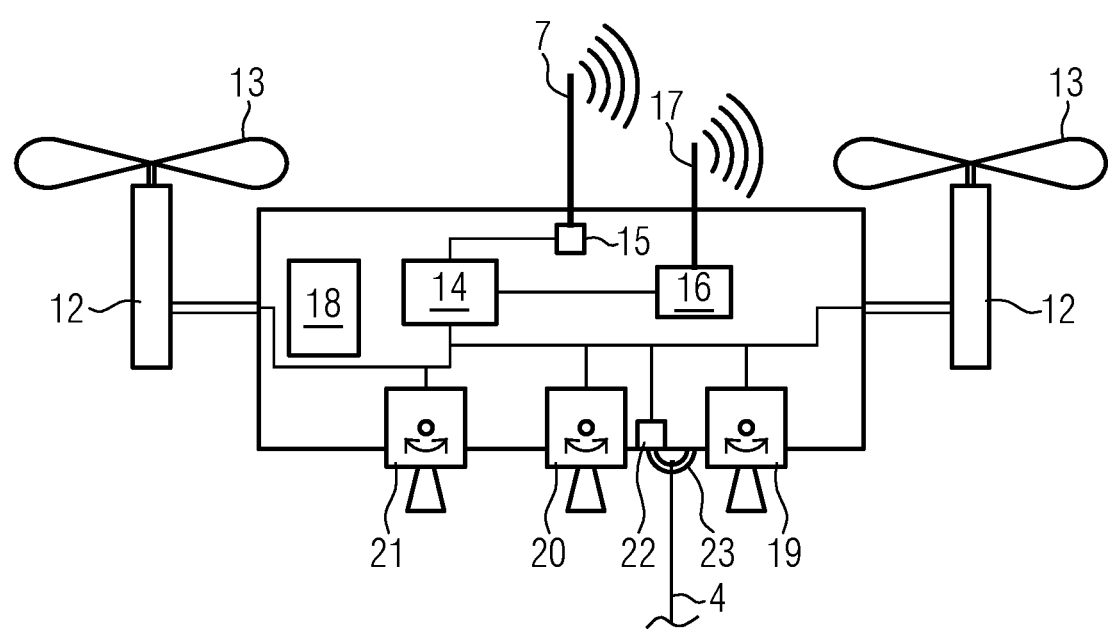

The drone 2 (FIG. 2) has several motors 12 for driving a propeller 13 each. In the present embodiment the drone is an octocopter with eight motors 12, each driving one of the propellers 13 (for simpler illustration only two motors and two propellers are shown in the figures).

The drone 2 is provided with a central control device 14. The central control device 14 is connected to a transceiver device 15 designed for transmitting and receiving a radio signal via the aerial 7.

The drone 2 further has a location sensor 16, which is a satellite sensor, in particular a GPS sensor, in the present embodiment. The location sensor 16 is provided with an aerial 17 for receiving satellite signals. In principle other location sensors can be used as well, for example sensors performing a location by means of radio telephone signals. For use in the mountains, however, a location sensor receiving satellite signals is recommended, because these are available everywhere.

The energy supply of the drone 2 is provided by means of a battery 18.

In addition to the location sensor 16, the drone 2 can comprise further sensors, such as a camera 19 for visible light, a camera for infrared radiation (=thermal imager) 20 and an altimeter device 21. The altimeter device 21 can be a laser scanner capable of determining the distance between the altimeter device 21 and the nearest object with an accuracy of a few centimetres at an overall distance corresponding to the length of the cord 4. The location sensor can also be used as an altimeter device, however. A radio location sensor can be used reliably even in bad weather conditions. As a rule the absolute elevation cannot be measured by a radio location sensor with the accuracy of a laser scanner, but the relative elevation can be determined very precisely by a radio location sensor.

The sensors 19, 20 and 21 are in each case oriented vertically downwards at the drone in their viewing direction. The sensors 19, 20 and 21 are preferably suspended pivotably at the drone 2, so that they can maintain their vertically downward viewing direction automatically and independently of a tilt of the drone 2. Such suspensions are known from the field of camera technology.

The drone has a dropping device 22, at which the cord 4 is suspended. The dropping device 22 can be opened automatically, so that the cord 4 is released from the drone 2. In the present embodiment the dropping device comprises a hook which can be pivoted away laterally, so that the cord can slide off the hook 23.

At the central control device 14, several modules are provided, each being realised by a programme unit. These modules comprise
 an autopilot flight module
 a remote control flight module
 a communication module.

The communication module reads out the sensor signals of the location sensor 16, the camera for visible light 19, the thermal imager 20 and/or the altimeter device 21 and either makes available these sensor signals to the other modules and/or transmits the sensor signals to the remote control 18 via the transceiver device 15. The image signals generated by the cameras 19, 20 can be displayed on the screen 11. The location coordinates can be shown in text form on the screen 11.

The autopilot flight module can automatically approach a destination whose location coordinates have been stored in advance. By continuously comparing the location coordinates detected by the location sensor 16 to the target coordinates, the destination can be approached automatically.

The destination can be reached solely by means of the location coordinates provided by the location sensor 16.

A drone with an autopilot flight module can also be permanently positioned on a specific mountain in a base station. The base station has a system for automatically charging the battery of the drone and for automatically fitting an explosive charge. From the base station the drone flies to the individual blasting sites, which are predetermined or determined by means of a system for assessing the avalanche risk. A blasting process and thus a drone flight can be triggered by a user from afar, e.g. via the Internet or another communication network.

The altimeter device 21, with which the elevation of the destination can be corrected, is provided optionally. With the altimeter device 21 the distance between the drone 2 and the ground is measured directly vertically below the drone 2. Since the thickness of the snow layer increases at a snowfall, the altitude of the ground can vary. As a result this distance from the ground can change from that of the destination defined by means of the previously stored location coordinates. If it is desired, however, that the explosive charge is located at a specific elevation above ground or above the surface of the snow cover when being ignited, the elevation of the destination can be corrected during the flight of the drone 2 by means of the distance measurement by the altimeter device 21, and the explosive charge 3 can in this way be located precisely at the desired level above the surface of the snow cover or above the ground. This can be achieved fully automatically by means of the autopilot flight module. On reaching the destination, the explosive charge 3 can be ignited automatically by the central control device 14 if the legal framework permits. For this purpose a suitable ignition signal has to be transmitted by the central control device 14 to the ignition mechanism 5. This can be done via radio or by means of a wired transmission.

The ignition mechanism can also be triggered under remote control, however. If the ignition mechanism receives an ignition signal, the explosive charge 3 is ignited without delay and explodes above the snow cover, thus triggering an avalanche.

The autopilot flight module then flies the drone 2 automatically back to the starting point where the drone 2 was started.

Within the scope of the invention it is also possible, however, that the autopilot flight module is designed such that the drone flies across the potential avalanche cone in a meander pattern from the starting point to the destination, and that the image signals of the cameras 19, 20 are transmitted to the screen 11, so that the user of this device can find out whether there are any humans or animals in the potential avalanche cone. If this is the case, the blasting process can be aborted and the drone 2 can return without performing the blasting operation.

With the remote control flight module a user, in particular a blaster can control the flight of the drone 2 with the remote control 8 and trigger the ignition under remote control by means of a radio signal from the remote control 8. Here, too, the user can initially fly over the potential avalanche cone and scan with the cameras 19, 20 whether there are any humans and/or animals here.

In order to safeguard predetermined structures such as roads, villages, ski slopes, it can be expedient to approach the potential destinations in summer. The cord 4 is attached to the drone 2 with a weight, so that the position of the explosive charge relative to a respective blasting site can be simulated by simple means. To simulate the snow cover, the cord 4 can be slightly longer than when used for blasting. The location coordinates of these destinations are stored in this simulation, so that they can be covered automatically and reliably in the presence of a snow cover. In principle any number of destinations can be stored and then flown across when required. In this way a specific structure can be reliably protected at many different points by the timely triggering of avalanches. This is even possible if the weather conditions are so bad that a helicopter would not be able to fly. By igniting the explosive charge 3 at a position distant from the surface of the snow cover, an avalanche blasting operation can be carried out repeatedly and reliably at the various destinations. There is no risk that the explosive charge might slip on the snow cover and explode elsewhere.

When approaching the destination with a snow cover present, the thickness of the snow cover can be measured by comparing the stored location coordinates and the measurements obtained by means of the altimeter device 21. This is relevant information for the assessment of the avalanche risk. The location coordinates describing a mountain slope are preferably recorded in the control device 14 and/or in the remote control 8, so that a profile of the thickness of the snow cover can be determined by comparing the current location coordinates of the drone 2 and the simultaneously gathered elevation values. Such a snow cover measurement can also be performed independently of an avalanche blasting operation in order to assess the avalanche risk. If such a snow cover measurement is carried out repeatedly at intervals in time, the thickness of the individual snow layers can be determined. If these data are linked to the corresponding weather data, in particular the temperature and wind at the respective snowfall, a very precise assessment of the avalanche risk can be obtained. This is also possible automatically with a self-learning system, in particular a neuronal network, which can be taught to assess the avalanche risk for specific areas.

The self-learning system is taught by feeding the thickness values of the snow cover and corresponding avalanche events on the slope concerned to the self-learning system in a learning phase. After the learning phase the self-learning system can then assess the avalanche risk using the thickness values of the snow cover and the weather data, if applicable. In this way the avalanche risk for a slope can be assessed individually, and the assessment can be based on a large data base and is therefore considerably more reliable than conventional methods for assessing the avalanche risk.

Figure 3:
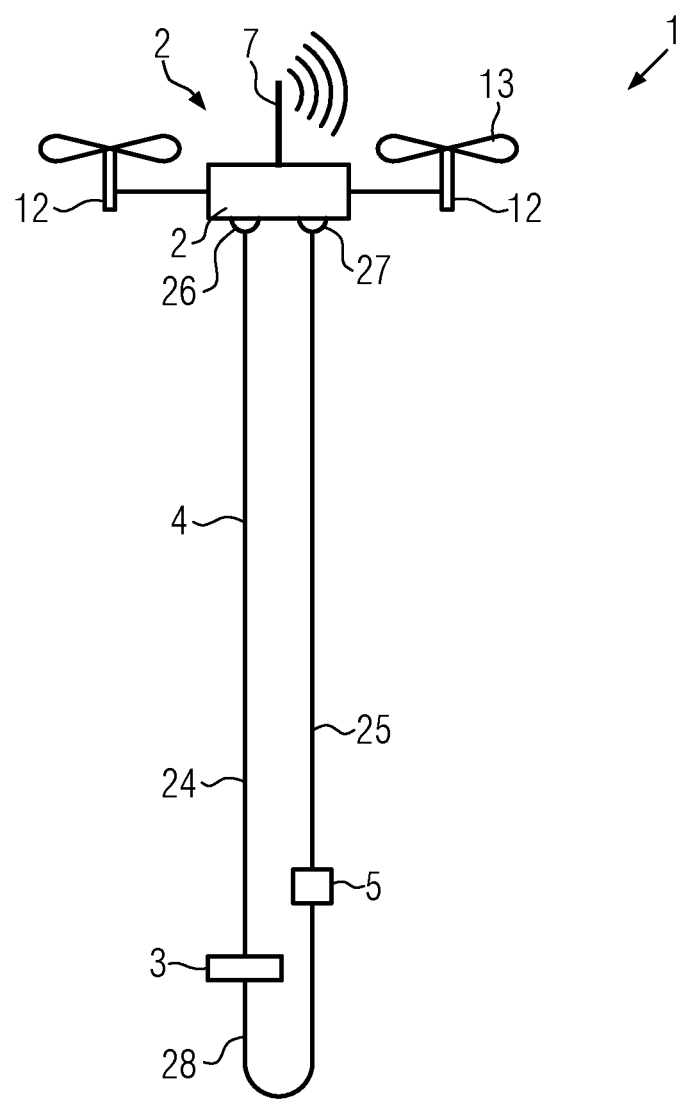

A second embodiment of the device 1 for blasting avalanches (FIG. 3) is explained below. The second embodiment again has a drone 2, an explosive charge 3 attached to the drone 2 in a freely suspended manner by means of a cord 4 and an ignition mechanism 5 for igniting the explosive charge 3. In the second embodiment identical components are described using the same reference symbols as in the case of the first embodiment. The above explanations for the individual components of the device for blasting avalanches apply in the same way to the second embodiment, unless stated otherwise below.

In this embodiment the cord 4 is formed from two sections, these being a permanent section 24 and a losing section 25. The ignition mechanism 5 is a mechanical ignition mechanism designed as a break igniter. The ignition mechanism 5 is suspended from the drone 2 by the losing section 25. The explosive charge 3 hangs at the drone 2 by means of the permanent section 24. The explosive charge 3 and the ignition mechanism 5 are connected by a fuse cord 28 connecting the two sections 24, 25 to form a loop hanging slightly below the ignition mechanism 5 and the explosive charge 3. Each of the sections 24, 25 of the cord 4 is fastened to the drone 2 by a latch 26, 27.

The losing section 25 of the cord 4 is a thin hemp rope which is separated from the drone 2 and thrown off by releasing the latch 27 when the ignition mechanism 5 is triggered. As a result the ignition mechanism 5 drops slightly downwards until the fuse cord 28 is stretched. A part of the ignition mechanism which is connected to the losing section 25 separates from the other part of the ignition mechanism 5 and is sacrificed together with the losing section 25. In this the ignition is triggered mechanically and the explosive charge 3 is made to explode by way of the fuse cord 28. As any expert knows, the fuse cord does not ignite directly, but rather by means of an igniter (not shown) located at the explosive charge.

The losing section is a hemp rope which is sacrificed. The hemp rope decomposes without burdening the environment.

The mechanical ignition mechanism 5 has a very simple and reliable structure and can be used reliably even in adverse weather conditions.

Figure 4:
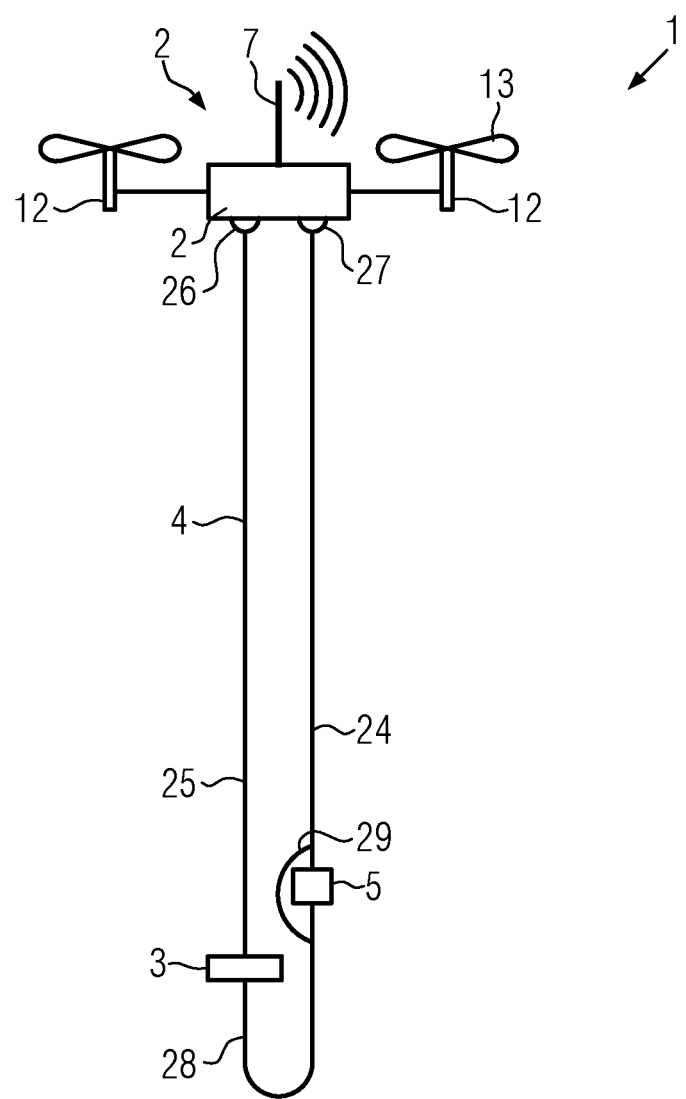

According to a modification of the second embodiment (FIG. 4), the ignition mechanism 5 is suspended from the drone 2 by the permanent section 24 and the explosive charge 3 by means of the losing section 25. The permanent section 24 and the fuse cord 28 are connected by a bypass loop 29 in parallel with the igniter 5.

To trigger the blasting process, the latch 26 is released, so that the losing section separates from the drone 2 and the explosive charge 3 drops slightly downwards until the fuse cord is stretched. As a result a part of the ignition mechanism connected to the losing section 25 separates from the other part of the ignition mechanism 5, whereby the ignition mechanism is triggered. The fuse cord 28 and the permanent section 24 are held together via the bypass loop 29. The explosive charge 3 is made to explode via the fuse cord 28.

Figure 5B:
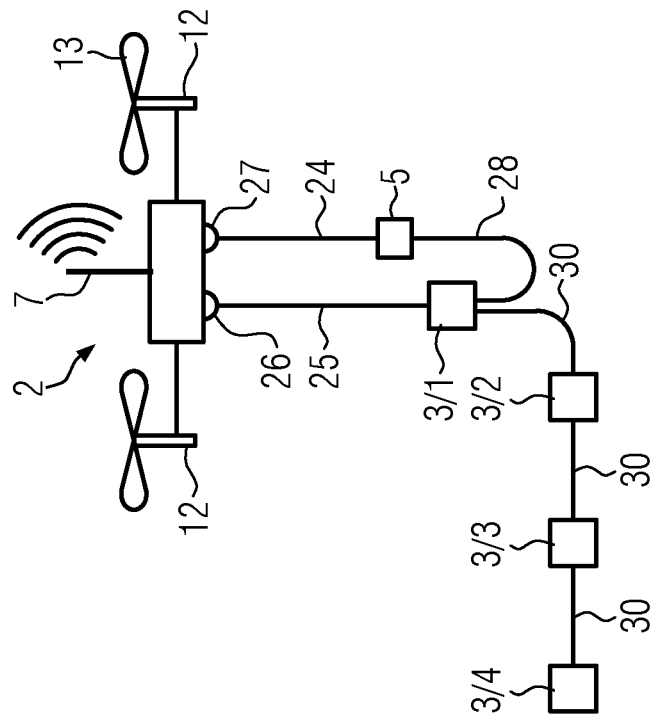
Figure 5A:
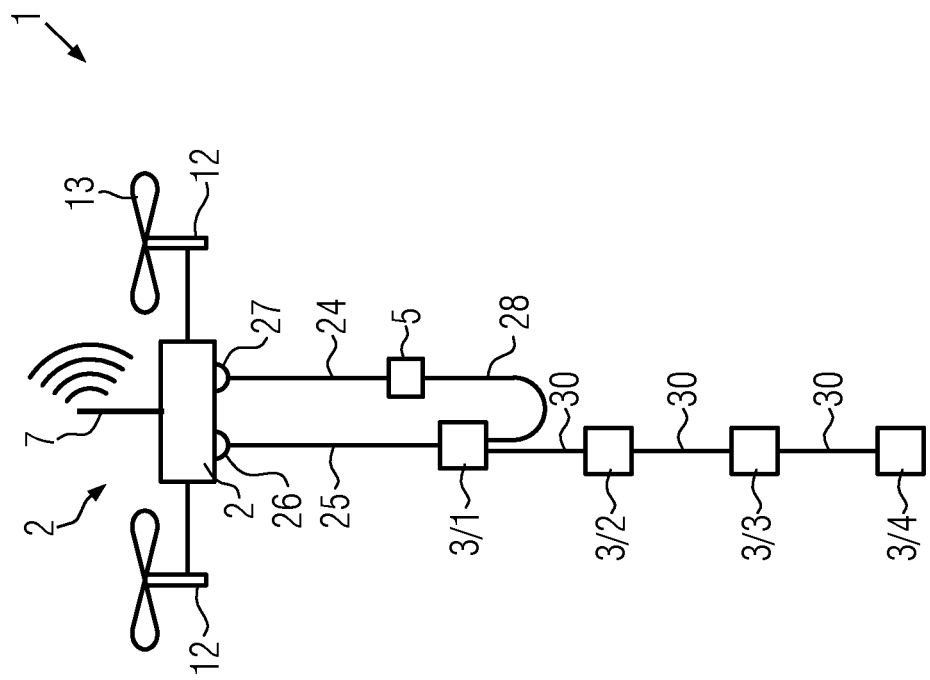

A third embodiment is designed to produce a tear-off edge in a snow cover by distributing several explosive charges 3/1-3/4 across a slope (FIG. 5*a* to 5*b*). This third embodiment substantially corresponds to the second embodiment shown in FIG. 4, only the bypass loop 29 being omitted. In addition several explosive charges 3/1-3/4 are provided instead of a single explosive charge 3, these being connected to one another by means of a detonating cord 30. The detonating cord 30 differs from the fuse cord 28 in that the ignition flame progresses much faster here. Conventional detonating cords, such as one known under the brand name Detonex, have an ignition flame propagation speed of 6000 m/s. As a result the explosive charges connected to the detonation cord detonate virtually at the same time. With the fuse cord 28 a predetermined time of a few seconds to a few 10 seconds can be set between the triggering of the ignition mechanism 5 and the blast.

As no bypass loop 29 is provided, not only is the losing section 25 released from the drone 2 as the catch 26 opens, but the ignition mechanism 5, when triggered, is divided into two parts, so that all explosive charges 3/1-3/4 and the fuse cord 28 are separated from the drone or the permanent section 24 of the cord 4.

The explosive charges 3/1-3/4 can be laid across the slope in a line, wherein the lowest explosive charge 3/4 is deposited on the ground first and the explosive charges 3/1-3/3 placed above are deposited successively. These explosive charges form a so-called cutting charge for cutting a tear-off edge in the snow cover. When the ignition mechanism 5 is triggered and the explosive charges 3/1-3/4 are thus dropped completely, the fuse cord 28 is initially ignited, leading to a detonation of the explosive charges 3/1-3/4.

With such a cutting charge avalanches can be blasted very efficiently on a wide slope in snowdrifts.

Such a device 1 for blasting avalanches can have an electric ignition mechanism instead of the mechanical ignition mechanism 5, but in this case a separating device has to be provided for separating the explosive charges from the drone. The separating device is preferably provided below the ignition mechanism 5, so that the latter remains at the drone and can be reused.

Since the present device and the present method require neither permanent installations nor the use of a helicopter, the technical complexity and thus the costs incurred are considerably lower than in the case of conventional devices for blasting avalanches.

One of the most essential advantages of the device according to the invention and the method according to the invention lies in the fact that avalanches can be triggered even in situations in which it has not been possible before. Such situations especially exist if it snows continuously for several days, in particular over several weeks. These situations do not occur often, but they are those with the highest hazard potential, wherein very special avalanche risks not envisaged previously by anybody can arise at certain wind conditions.

The invention claimed is:

1. A device for blasting avalanches, comprising:
a drone, an explosive charge attached to the drone in a freely suspended manner by a cord, and an ignition mechanism for igniting the explosive charge, the ignition mechanism being remote-controlled or including automatic triggering,
wherein the ignition mechanism is arranged at the cord in a section extending between the drone and the explosive charge at a first distance from the drone and at a second distance from the explosive charge to prevent misfiring of the ignition mechanism by electric elements of the drone and to prevent damage to the ignition mechanism during a blasting of the explosive charge;
the device further comprising a location sensor, an altimeter device for measuring a distance from the ground, and a control device with which the device can automatically approach a specific destination in accordance with location coordinates determined by the location sensor.

2. Device according to claim 1, wherein the first distance between the drone and the ignition mechanism is at least 5 m.

3. Device according to claim 1, wherein the first distance between the drone and the ignition mechanism is at least 10 m.

4. The device according to claim 1, wherein the cord has a blasting section directly connected to the explosive charge and to a remainder of the cord by a releasable clamp.

5. The device according to claim 1, wherein the device comprises a facility for detecting whether the explosive charge is brought in contact with the ground and an altimeter device for measuring an elevation of the drone.

6. Device according to claim 5, wherein the altimeter device determines by means of radio signals the elevation or a location of the drone in a three-dimensional coordinate system.

7. Device according to claim 1, wherein the cord is at least 10 m long, with a first end of the cord attached to the drone and a second end of the cord connected to the explosive charge.

8. Device according to claim 1, further comprising a camera for visible light and/or a camera for infrared radiation.

9. Device according to claim 1, further comprising a radio device for transmitting sensor signals and/or image signals.

10. Device according to claim 1, wherein the cord is secured to the drone by a dropping device that is triggered by a remote control.

* * * * *